July 6, 1965 P. BAUER 3,192,938

FLUID MULTI-STABLE DEVICE

Filed Sept. 5, 1961 3 Sheets-Sheet 1

INVENTOR
PETER BAUER

BY

ATTORNEY

July 6, 1965 P. BAUER 3,192,938

FLUID MULTI-STABLE DEVICE

Filed Sept. 5. 1961 3 Sheets-Sheet 2

July 6, 1965 P. BAUER 3,192,938

FLUID MULTI-STABLE DEVICE

Filed Sept. 5, 1961 3 Sheets-Sheet 3

3,192,938

FLUID MULTI-STABLE DEVICE

Peter Bauer, Ambler, Pa., assignor to Sperry Rand Corporation, New York, N.Y., a corporation of Delaware Filed Sept. 5, 1961, Ser. No. 135,824
17 Claims. (Cl. 137—81.5)

This invention relates to a multistable fluid operated device which utilizes the flow of a fluid such that the device performs functions which are analogous to some functions now being performed by electronic components or other electrical devices, such as a switch.

Electronic components are capable of performing such functions as switching, detecting and amplifying a signal. Such electronic components are invariously delicate and undesirably sensitive to environmental conditions such as temperature, humidity, vibrations and the like. Mechanical systems are known which will perform functions somewhat analogous to functions performed by electronic devices. These mechanical devices, however, comprise moving parts. This is undesirable as failure in any part usually results in improper operation of the entire device.

Broadly, therefore, it is an object of this invention to provide a multistable fluid operated device which performs some functions which are analogous to functions performed by existing electronic or mechanical components.

More specifically, it is an object of this invention to utilize the flow of a fluid under pressure so that the fluid acts in a manner similar to the manner in which electrons act in an electronic component.

It is a further object of this invention to provide a multistable fluid-operated device, in accordance with the above objects, which has no moving parts.

Still another object of the invention is to utilize the principles of boundary layer control and vortex action to effect and support a definite multiple switching action of a fluid stream from one operating position to one or more other operating positions.

Still another object of the invention is to provide an improved pure fluid amplifier.

Still another object of the invention is to provide an improved fluid AND-gate.

Still another object of the invention is to provide an improved fluid OR-gate.

Still another object of the invention is to provide an improved fluid switching device having memory capabilities.

According to this invention, the energy of a fluid stream under pressure is utilized in a switching device which has no moving parts. The device utilizes the principle of boundary layer control so that the fluid under pressure performs definite multistable switching actions between a number of operating positions. An operating position effected by the boundary layer phenomena is continued and sustained by a vortex action resulting from the operating position of the fluid stream and sustained in turn thereby. In addition to providing said multistable switching action, the function of amplification and computational multiplication can be performed by the device.

Figure 1:
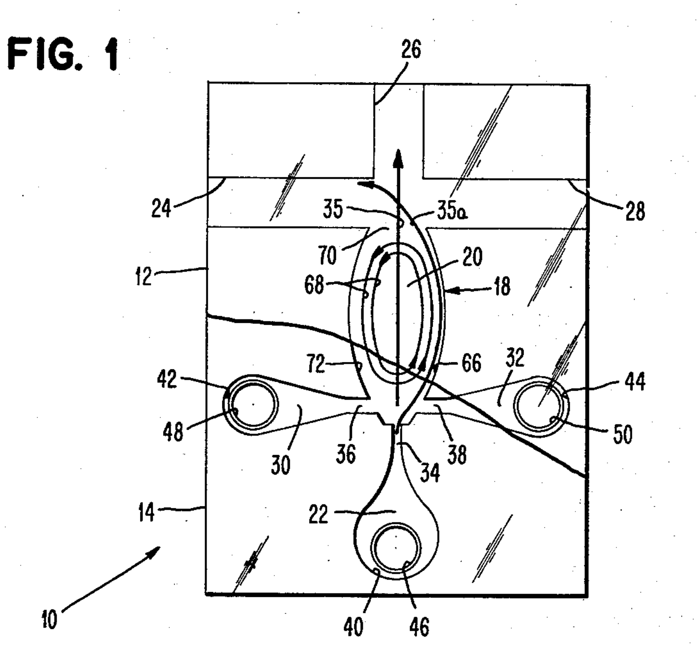

The nature of the invention, as well as other objects and advantages will be more clearly understood from the following description and the accompanying drawings in which:

FIG. 1 illustrates a plan view, partly in section of a fluid-operated device according to the invention.

Figure 1A:
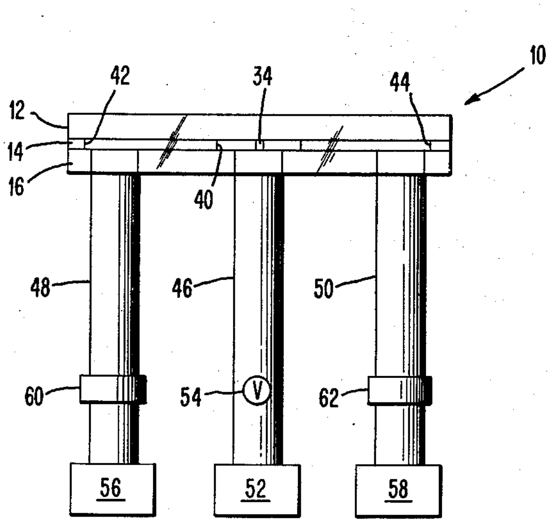

FIG. 1*a* illustrates an end view of the device shown in FIG. 1 with means for applying fluid to the device.

Figure 2:
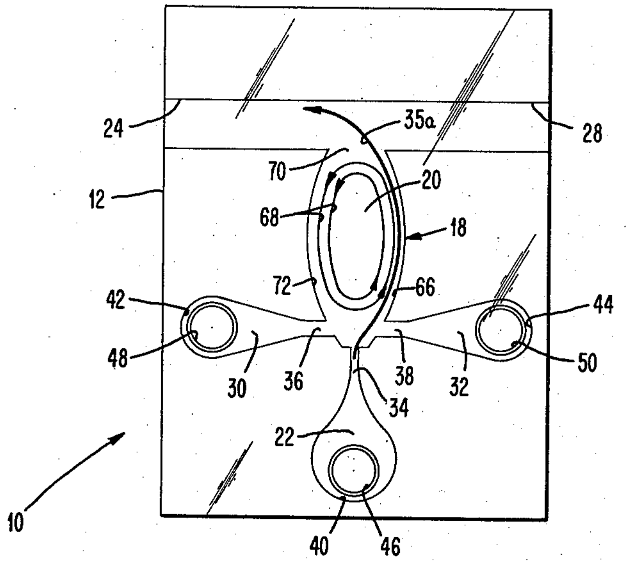

FIG. 2 illustrates another embodiment of the device shown in FIG. 1.

Figure 2A:
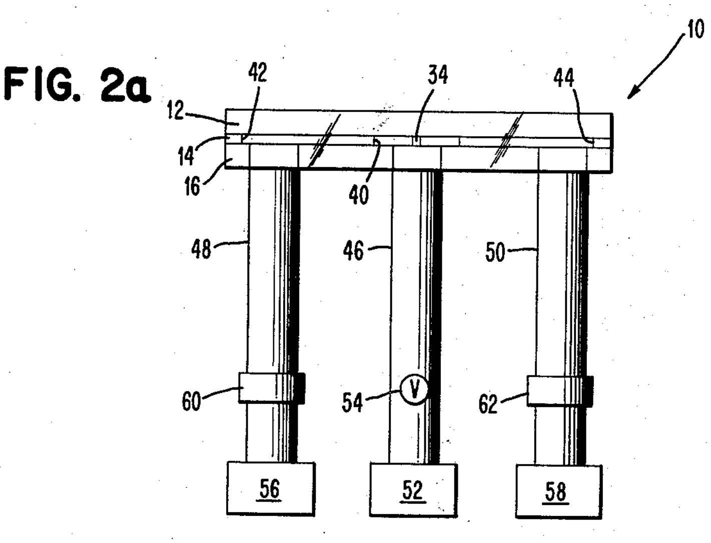

FIG. 2*a* illustrates an end view of the device shown in FIG. 2 with means for applying fluid to the device.

Figure 3:
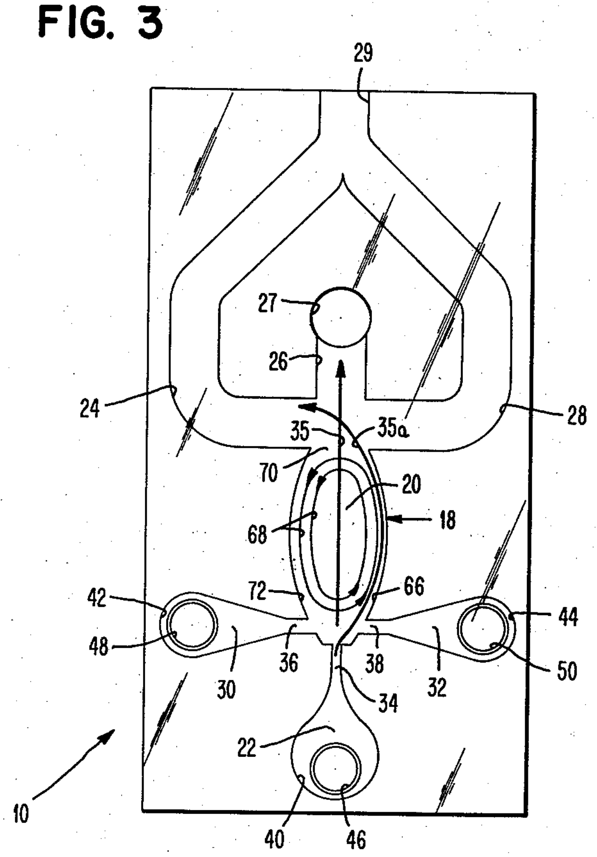

FIG. 3 illustrates another embodiment of the device shown in FIG. 1.

Referring now particularly to FIGS. 1 and 1*a*, a fluid operated device 10 is formed by three flat laminae 12, 14 and 16. Lamina 14 is positioned between laminae 12 and 16 and is tightly sealed between them by suitable means, such as screws or cement (not illustrated). The laminae 12, 14 and 16 may be of any metallic, plastic, or other suitable material. For purposes of illustration, laminae 12, 14 and 16 are shown as being of a clear plastic material.

The lamina 14 with its cut out section may be produced, for example, by means of a cutting or stamping operation. The entire cut out section is designated as a configuration 18. The cut out section or configuration 18 includes a chamber 20, a fluid supply inlet 22, three fluid outlets 24, 26 and 28 and two control stream inlets 30 and 32. The control stream inlets 30 and 32, for example, may be substantially perpendicular to the longitudinal axis of the chamber 20. The inlets 22, 30 and 32 form constricted supply and control orifices 34, 36 and 38 respectively, all opening into the chamber 20. The term orifice as used herein, includes orifices having parallel converging or diverging walls or any conventional shape. The supply inlet 22 and the control inlets 30 and 32 communicate with bores 40, 42 and 44 respectively formed in lamina 16. The output ends of the fluid outlet openings 24, 26 and 28 may communicate with various other control or utilization devices (not illustrated).

Bores 40, 42 and 44 may be internally threaded to receive tubes 46, 48 and 50, respectively, which may be externally threaded. The end of the tube 46, extending from lamina 16 is attached to a source 52 of fluid under pressure. The fluid under pressure may be air or other gas, or water or other liquid. Gases, with or without solid or liquid particles, have been found to work very satisfactorily. The above applies equally to the nature and properties of the fluid used for the control stream inlets 30 and 32. Also, in case a liquid is used, the liquid may have solid particles or gas bubbles entrained therein. Fluid flow regulating devices, such as a valve 54, may be used in conjunction with the fluid source 52 so as to insure a constant flow of fluid at a desired pressure. Such fluid regulating devices are of conventional construction.

A source 56 of fluid under pressure provides the control stream at the inlet 30 and the control stream at the inlet 32 is provided by a source of fluid 58. Numerals 60 and 62 respectively represent any means, such as pressure transducers, which cause a fluctuation or variation in pressure in the control fluid carried in tubes 48 and 50, respectively.

Fluid flowing from source 52, entering the device 10 through inlet 22 is assumed to be at a certain pressure above atmospheric pressure. As the stream of fluid is reduced in cross-sectional area by the inlet orifice 34, its velocity increases. The stream 35 of reduced cross-sectional area leaving orifice 34 and entering chamber 20, is called the power stream of the device. If no external or internal forces are present, the power stream will travel longitudinally through the chamber 20 and exit, undisturbed in its motion, via the outlet 26.

The stream of fluid issuing from either orifice 36 or 38 is termed a control stream. A control stream may be a steady continuous stream or be pulsed for short periods of time. A control stream, issuing at relatively small pressure and at substantially right angles to the power stream, will upon impingement with the power stream, cause a considerable deviation of the trajectory of the power stream 35. The principle involved is that of momentum exchange, since the control stream imparts momentum to the power stream.

Assuming that a control stream pulse issues from control stream orifice 36, the power stream 35, traveling through the chamber 20 linearly, is deviated toward the right hand side wall 66 of the chamber. The deviated power stream, now following the contour of the wall 66, is indicated by arrow 35*a*. Due to the contour of the wall 66, a portion of the power stream is diverted to produce a vortex, indicated as 68, in the remaining space of the chamber 20. The established vortex 68 is being continuously supplied with a portion of the fluid of the deviated power stream 35*a*. The supplying of fluid to the vortex 68 occurs mainly in the region 70 where the deviated power stream leaves the chamber 20 substantially tangentially. Once the vortex has been established by the deviated power stream, the vortex maintains the power stream in its deviated position along the wall 66 of the chamber, even after the control stream pulse has been terminated. This situation is generally expressed as "the power stream is locked onto the wall."

If now a control stream issues from the control stream orifice 38, the power stream 35*a* will be switched, i.e. deflected towards the wall 72 in the same manner as described above but in the opposite direction. The power stream, which now will create a vortex on its right hand side, will be locked onto the wall 72 by this vortex.

From the above it will be seen that the power stream will remain deviated or switched towards either the outlet 24 or 28 into which it was last directed or commanded by the control stream, even after the control stream pulse has ended. Since, accordingly, information may be introduced into the device at a certain moment and be extracted at a later moment, the device has memory properties and may be used for example as a memory unit in fluid data processors.

Further, since the energy contained in the control stream is of lower level than that of the power stream, the device has amplification properties and may therefore be called a fluid amplifier.

It will be understood that the power stream 35 will be stable in its linear path through chamber 20, only if the power stream leaves the orifice 34 at sufficient pressure. The pressure of the power stream leaving the orifice 34 is determined by the pressure of the supply source 52. The pressure of the power stream is further determined by the area of orifice 34, the pressure decreasing with decreasing area. If the pressure decreases to below a certain minimum level, the power stream will become unstable. Even very slight disturbances along the boundaries of the stream, such as resulting from the unavoidable dimensional non-symmetries of the device, will cause the power stream to deflect to and become locked onto the wall 66 or 72 of the chamber 20. Thus, it will be noted that even though no control pulse is applied at either orifice 36 or 38, an output pulse will still be produced at either outlet 24 or 28. The output pulse will appear at outlet 24 if the power stream happened to lock onto wall 66 of chamber 20, and at outlet 28 if the power stream locked onto wall 72.

In addition to the means mentioned above to render the power stream unstable, instability may also be inflicted upon the power stream by proper selection of the dimensions of the region 70 of the chamber 20. It will be understood that the resistance presented to the power stream by region 70 of a small cross-sectional area may cause the power stream to become unstable with the same results as described above.

If a control pulse is applied at control orifice 36 or 38, the power stream will be deflected into outlet 24 or 28 respectively.

If, however, a control pulse of equal magnitude appears at both control orifices 36 and 38 simultaneously, the power stream will move through the chamber 20 undeflected, and leave the device via outlet 26 thereby producing an output pulse at this outlet. Those familiar with computer technology will understand that the device as just described may be used as a fluid AND-gate, since whenever both of its inputs receive a pulse, a pulse is produced at its output.

In the region of intersection of the outlets 24, 26 and 28 a power stream, leaving through one outlet will create a partial vacuum in the two remaining outlets (ejector principle). For example, in the situation illustrated by FIG. 1, the deflected power stream 35*a* leaving via outlet 24 will create a partial vacuum in the outlets 26 and 28. This partial vacuum may be considered as representing a signal available at the outlets 26 and 28.

The control streams active at either orifice 36 or 38 have, heretofore, been assumed to be at positive pressure. It will be understood, however, that the power stream may be controlled or switched from one position to another by means of control pulses at negative pressure in a manner similar to that described above for control pulses at positive pressure.

Referring now particularly to FIGS. 2 and 2*a*, there is illustrated another embodiment of the device illustrated in FIGS. 1 and 1*a*. Like parts are indicated with the same reference numerals. It will be noted that both devices of FIGURES 1 and 2 are identical except that the device illustrated by FIGS. 2 and 2*a* has the central outlet 26 omitted. The power stream leaving the orifice 32 travels through the chamber 20 longitudinally, and, dividing itself over the outlets 24 and 28, leaves the device 10. Because of dimensional non-symmetries inherently present, the power stream cannot be expected to divide itself equally through both outlets 24 and 28. Thus, the power stream will be unstable and, although no control stream pulse of either direction is as yet applied, move to either the right hand side or the left hand side wall of chamber 20. The power stream may move to wall 66, for example, follow the contour of the wall 66 and leave the device 10 via outlet 24. In a manner, as described in connection with FIG. 1, the power stream will become locked onto wall 66 by the vortex, created by its own motion on its left hand side within the chamber 20.

In order to switch the device to its other operating position a control stream pulse must be applied through the orifice 38 in order to move and lock the power stream to the opposite wall 72 of the chamber 20. In this position, the power stream will leave the device via outlet 28, representing its other operating position.

Referring now particularly to FIGURE 3 there is shown another embodiment of the device illustrated by FIGS. 1 and 1*a*. Like parts are indicated by the same numerals. It will be noted that in the device of FIG. 3, the outlets 24 and 28 of FIG. 1 are bent to be combined into a single outlet 29.

If no control signal is applied to either control orifice 36 or 38, the power stream 35 will travel in a straight line through the chamber 20 and leave the device via outlet 26, thereby producing an output signal at this same outlet. If a control signal is applied to both control orifices 36 and 38 simultaneously, the power stream 35 will again travel through the chamber undeflected, leaving the device via outlet 26 and produces again a signal at this output. In both cases outlet 26 may constitute alternatively a discharge to atmosphere.

If, however, a control signal appears at control orifice 36 or 38, the power stream 35 will be deflected into outlet 24 or 28 respectively, resulting in both cases in an output signal to appear at outlet 29. Those familiar with computer technology will understand that the device as just described may be used as an exclusive fluid OR-gate, since whenever a pulse is present on any one of its inputs (orifices 36 or 38), a pulse appears at its output (outlet 29).

It will be understood that modifications and variations may be effected without departing from the scope of the present invention. For example, it will be understood that although the devices illustrated and described are basically of planar construction, a device according to the invention may have a third dimension of substantial magnitude. Also, the number of power stream inlets, control stream inlets and power stream outlets may be varied as a specific application of the device may require.

What I claim is:

1. A fluid device comprising an oval-shaped chamber creating a vortical flow within said chamber of a portion of power fluid applied thereto, means for applying power fluid to said chamber, a plurality of outlets from said chamber, means for applying control fluid to said chamber to selectively direct said power fluid through one of said outlets and to cause said vortical flow of fluid within said chamber to maintain said power fluid directed through said selected outlet.

2. A fluid control device comprising a chamber, means for connecting a source of power fluid to said chamber, a plurality of outlets from said chamber, means for connecting a source of control fluid into said chamber to selectively direct said power fluid through one of said outlets, and said chamber including concavely shaped wall portions for creating a vortical flow of a portion of said power fluid within said chamber to maintain said fluid directed through said selected outlet.

3. A fluid control device comprising a chamber, a power fluid source, means for applying said power fluid from said power fluid source into said chamber, a plurality of outlets from said chamber, two control fluid sources, means for applying control fluid from one of said control fluid sources into said chamber to selectively direct said power fluid through one or the other of said outlets, and concavely shaped wall means included within said chamber responsive to directed fluid setting up a vortex flow of said power fluid within said chamber to maintain said fluid directed through said selected outlet.

4. The invention as set forth in claim 3 wherein the outlet selected is dependent upon which of said two sources of control fluid is used to direct said power fluid.

5. The invention as set forth in claim 4 wherein said chamber is substantially oval shaped.

6. The invention as set forth in claim 5 wherein the two sources of control fluid are substantially in alignment with respect to each other and at right angles with respect to said source of power fluid.

7. The invention as set forth in claim 6 wherein said power fluid is maintained through said selected outlet after the application of said control fluid is discontinued.

8. A fluid multistable device comprising a first, a second and a third lamina, said second lamina being fluid-tightly sealed between said first and third lamina, said second lamina having a cut-out configuration having a longitudinal axis and including a substantially oval main chamber, said configuration further including a power stream inlet chamber, first control fluid and second control fluid inlet chambers communicating with said main chamber through constricted passages, said power stream inlet chamber having its longitudinal axis coincident with said longitudinal axis of said main chamber, said first and said second control fluid inlet chambers having a common longitudinal axis extending perpendicular to said longitudinal axis of said main chamber and extending on opposite sides of said main chamber, said configuration further including first and second outlet channels communicating with said main chamber through an opening in said main chamber, said first and said second outlet channels having a common axis extending perpendicularly to said longitudinal axis of said main chamber, first and second outlet channels being located on opposite sides of said main chamber, a source of fluid under regulated pressure connected to said power stream inlet chamber, a first source of control fluid connected to said first control fluid inlet chamber, and a second source of control fluid connected to said second control fluid inlet chamber.

9. A fluid multistable device comprising a first, a second and a third lamina, said second lamina being fluid-tightly sealed between said first and third lamina, said second lamina having a cut-out configuration having a longitudinal axis and including a substantially oval main chamber, said configuration further including a power stream inlet chamber, first and second control fluid inlet chambers communicating with said main chamber, said power stream inlet chamber having its longitudinal axis coincident with said longitudinal axis of said main chamber, said first and second control fluid inlet chambers having a common longitudinal axis extending perpendicular to said longitudinal axis of said main chamber and extending on opposite sides thereof, said configuration further including first and second outlet channels communicating with said main chamber from opposite sides and having a common axis extending substantially perpendicularly to said longitudinal axis of said main chamber, a source of fluid under regulated pressure connected to said power inlet chamber, a first source of control fluid connected to said first control fluid inlet chamber, first pressure transducing means to vary the pressure of said first source of control fluid, a second source of control fluid connected to said second control fluid inlet chamber, and second pressure transducing means to vary the pressure of said second source of control fluid.

10. A fluid multistable device comprising first, second and third laminae, said second lamina being fluid-tightly sealed between said first and third lamina, and having a cut out configuration, having a substantially oval main chamber, said configuration further including a power stream inlet chamber, first and second control fluid inlet chambers communicating with said main chamber through constricted passages, said power stream inlet chamber having a longitudinal axis coincident with the longitudinal axis of said main chamber, said first and second control fluid inlet chambers having a common longitudinal axis extending perpendicular to said longitudinal axis of said main chamber and extending on opposite sides therefrom, said configuration further including first, second and third outlet channels communicating with said main chamber, said first and said third outlet channel having a common axis extending perpendicularly to said longitudinal axis of said main chamber and being disposed on opposite sides thereof, said second outlet channel extending away from said main chamber and having its axis coincident with said longitudinal axis thereof, a source of fluid under regulated pressure connected to said power stream inlet chamber, a first source of control fluid connected to said first control fluid inlet chamber, first pressure transducing means to vary the pressure of said first source of control fluid, a second source of control fluid connected to second control fluid inlet chamber, and second pressure transducing means to vary the pressure of said second source of control fluid.

11. A fluid multistable device comprising a first, a second and a third lamina, said second lamina being fluid-tightly sealed between said first and third lamina, said second lamina having a cut-out configuration having a longitudinal axis including a substantially oval main chamber, said configuration further including a power stream inlet chamber, first and second control fluid inlet chambers, said power stream inlet chamber and said first and second control fluid inlet chambers communicating with said main chamber through constricted passages, said power stream inlet chamber having its longitudinal axis coincident with said longitudinal axis of said main chamber, said first and second control fluid inlet chambers having a common longitudinal axis extending perpendicular to said longitudinal axis of said main chamber, said first and second control fluid inlet chambers extending on opposite sides of said main chamber, said configuration further including first, second and third outlet channels, all of said outlet channels communicating with said main chamber, said first and third outlet channels having a common axis extending perpendicular to said longitudinal axis of said main chamber and being disposed on opposite sides of said longitudinal axis of said chamber, said second outlet channel extending away from said main chamber and having an axis coincident with said longitudinal axis to said main chamber, first tubing means connected to said power stream inlet chamber, a source of fluid under regulated pressure connected to said first tubing means, second tubing means connected to said first control fluid inlet chamber, a first source of control fluid connected to said second tubing means, first pressure transducing means to vary the pressure of said first source of control fluid, third tubing means connected to said second control fluid inlet chamber, a second source of control fluid connected to said third tubing means and second pressure transducing means to vary to pressure of said second source of control fluid.

12. A fluid control device for use as an AND-gate, comprising a chamber having two walls forming an oval, a power fluid source, means for applying said power fluid from said power fluid source into said chamber, means disposed to render said power fluid unstable to cause said power fluid to flow along one of said walls of said chamber, said chamber including means for setting up a vortex flow of part of said power fluid within said chamber to maintain said power fluid along said one wall, a plurality of outlets from said chamber, two control fluid sources, means for applying control fluid from both of said control fluid sources into said chamber to direct said power fluid in a straight path through said chamber to one of said outlets when control fluid is applied simultaneously from said two control fluid sources into said chamber.

13. The invention as set forth in claim 12, wherein said means disposed to render said power fluid unstable comprises said power fluid source, the pressure from said power fluid source being adapted to be varied to produce instability of said power fluid within said chamber.

14. The invention as set forth in claim 12, wherein said means disposed to render said power fluid unstable comprises the means for leading said power fluid into said chamber, said last named means being dimensioned to produce instability of said power fluid within said chamber.

15. A fluid control device for use as an exclusive OR-gate comprising an oval-shaped chamber for creating a vortex movement within said chamber of fluid applied to said chamber, a power fluid source, means for applying said power fluid from said power fluid source into said chamber, at least a pair of outlets from said chamber, a common outlet connected to said pair of outlets, two control fluid sources, means for applying control fluid from one of said control fluid sources into said chamber to selectively direct said power fluid through one or the other of said outlets through said common outlet, and said directed fluid setting up a vortex flow of fluid within said chamber to maintain said fluid directed through said selected outlet.

16. A fluid control device for use as an AND-gate, comprising a chamber, said chamber including a supply inlet, a plurality of fluid outlets and a plurality of control fluid inlets, a power fluid source, means disposed to render said power fluid unstable to cause said power fluid to flow along one of said walls of said chamber, said chamber including concavely shaped wall means creating a vortical flow of part of said power fluid in its deflected position within said chamber to enhance the stabilization of said power fluid in its deflected position, means for applying control fluid to said control fluid inlets of said chamber to direct said power fluid in a straight path through said chamber to one of said outlets when said control fluid is applied simultaneously at said control fluid inlets.

17. A fluid control device for use as an exclusive OR-gate, comprising a chamber adapted to permit the movement of fluid, said chamber including a supply inlet, at least a pair of outlets and a plurality of control fluid inlets, a power fluid source, a common outlet connected to said pair of outlets, means for applying control fluid to said control fluid inlets to selectively deflect said power fluid through one or the other of said outlets to said common outlet, and said chamber including concavely shaped wall means to cause a part of said deflected fluid to be set up into a vortical flow within said chamber to maintain said deflected fluid deflected through said selected outlet.

References Cited by the Examiner

UNITED STATES PATENTS

| | | | |
|---|---|---|---|
| 1,381,095 | 6/21 | Starr | 239—468 XR |
| 1,658,797 | 2/28 | Charette et al. | 230—92 |
| 3,001,698 | 9/61 | Warren | 235—61 |
| 3,016,066 | 1/62 | Warren | 137—624.14 |
| 3,024,805 | 3/62 | Horton | 137—597 |
| 3,075,227 | 1/63 | Bowles | 15—346 |

LAVERNE D. GEIGER, *Primary Examiner.*

M. CARY NELSON, *Examiner.*

UNITED STATES PATENT OFFICE
CERTIFICATE OF CORRECTION

Patent No. 3,192,938 July 6, 1965

Peter Bauer

It is hereby certified that error appears in the above numbered patent requiring correction and that the said Letters Patent should read as corrected below.

Column 7, line 2, for "to" read -- of --; line 13, for "to vary to" read -- to vary the --.

Signed and sealed this 19th day of April 1966.

(SEAL)
Attest:

ERNEST W. SWIDER
Attesting Officer

EDWARD J. BRENNER
Commissioner of Patents